Jan. 12, 1960 W. C. LANNING 2,920,824

BINARY ADDER

Filed June 3, 1955 2 Sheets-Sheet 1

INVENTOR
WALTER C. LANNING
BY R. J. Craddock
ATTORNEY

Jan. 12, 1960 W. C. LANNING 2,920,824

BINARY ADDER

Filed June 3, 1955 2 Sheets-Sheet 2

INVENTOR

WALTER C. LANNING

BY R. W. Craddock

ATTORNEY 2,920,824

BINARY ADDER

Walter C. Lanning, Plainview, N.Y., assignor to Sperry Rand Corporation, a corporation of Delaware Application June 3, 1955, Serial No. 512,988

15 Claims. (Cl. 235—176)

This invention concerns an adding circuit for a binary digital computer and more particularly a circuit for performing the operation of addition on two binary digital numbers in the series mode, each number being represented by a train of electrical pulses.

In the operation of addition on two binary digital numbers in the series mode, the numbers to be added are considered digit by digit beginning with the least significant digits and a separate operation of addition is performed on each pair of corresponding digits. In performing the operation of addition on the $n$th corresponding digits of the two numbers, the carry term from the addition operation of the $(n-1)$th corresponding digits must be included to obtain the correct results.

A binary digital number may be represented by a train of electrical signals uniformly spaced in time, wherein the presence of a pulse designates the number 1 and the absence of a pulse designates the number 0. A circuit for performing the operation of addition on two numbers in binary digital form, each so represented, must perform the operation of addition by proper electrical combination of simultaneous signals of the trains representing the numbers. The circuit must also include in the operation of addition the carry term from the immediately preceding operation of addition. The output from the circuit must be a train of electrical signals representing in binary digital form the sum of the two numbers added and a train of electrical signals representing in binary digital form the carry term of the numbers added. Furthermore, the circuit must provide means for storing this carry term and releasing it for use on the next succeeding addition of corresponding pulses in the train.

It is therefore an object of this invention to provide an electrical computing circuit for performing the operation of addition on two binary digital numbers represented by a train of electrical pulses.

It is a further object of this invention to provide an electrical computing circuit for performing the operation of addition on corresponding order digits of two binary numbers and the carry term from the immediately preceding order digit addition.

It is a further object of this invention to provide an electrical computing circuit for performing the operation of addition on two binary digital numbers in the series mode.

It is a further object of this invention to provide components for electrical computing circuits which operate on binary digital numbers represented by trains of electrical pulses.

In this invention a pair of electrical pulse trains representing in binary digital form the two numbers to be added are coupled to the input terminals of a first Equivalence logical element. The output signals of the first Equivalence logical element represent an Equivalence operation and the NOT of an Equivalence operation on simultaneous digits of the pulse trains representing the two numbers to be added. The two pulse trains representing the numbers to be added are also coupled to a logical element whose output signal represents a Disjunctive operation on simultaneous digits of these two pulse trains. A storage means is provided for storing the carry term of the immediately preceding digit addition and for supplying as output signals this carry term and the NOT of this carry term. The output signals of the first Equivalence logical element and the carry term output signals of the storage means are combined and coupled to a second Equivalence logical element whose output signal represents the sum term of the numbers to be added. The signal representing the NOT of the carry term, the Equivalence output signal of the first Equivalence logical element, and the Disjunctive signal are combined in another logical element which performs a Disjunctive operation on its input signals. The output signal of this logical element represents the carry term of the numbers currently being added. This carry term is fed to the storage means for use in the operation of addition performed on the next succeeding corresponding digits.

Other objects and advantages of the present invention will become apparent from the specification taken in connection with the accompanying drawings, wherein.

Figure 1:
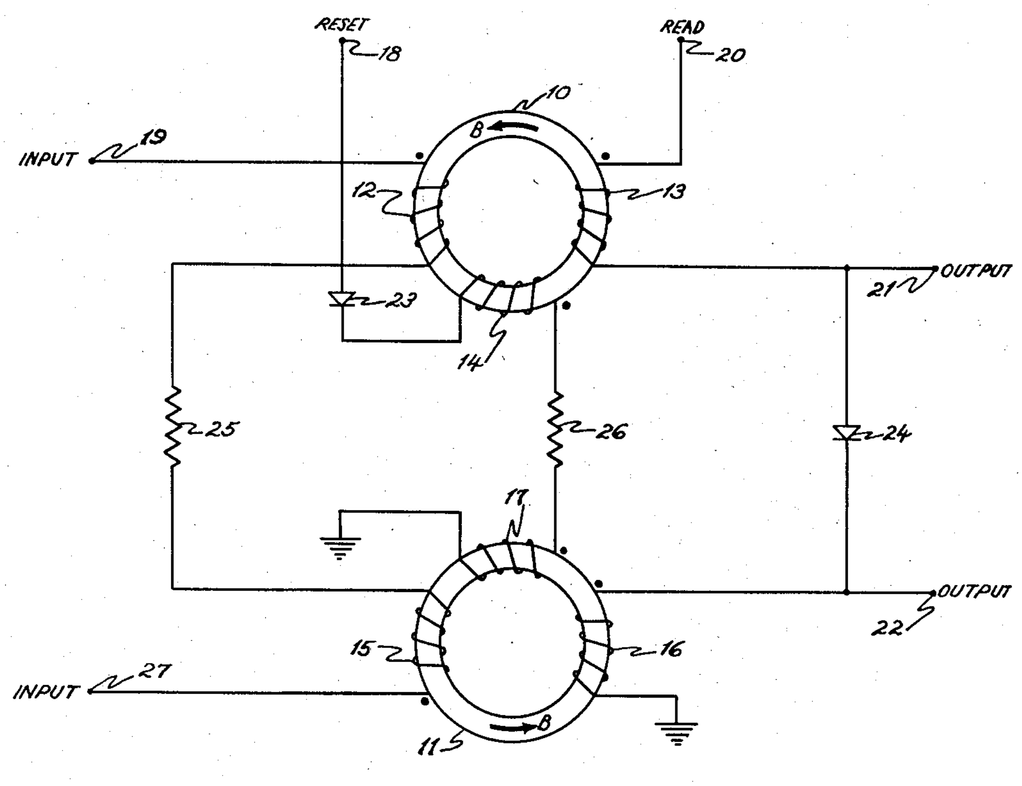
Fig. 1 is a schematic diagram of a circuit element suitable for use in this invention.

In the following description and claims certain of the mathematical operations which are peculiarly applicable to binary digital computation may be defined as follows:

Conjunction—yields a 1 out if both inputs are 1

| | | B 0 | B 1 |
|---|---|---|---|
| A | 0 | 0 | 0 |
| A | 1 | 0 | 1 |

This operation is performed by a Conjunctive logical element.

Disjunction—yields a 1 out if either input is 0

| | | B 0 | B 1 |
|---|---|---|---|
| A | 0 | 1 | 1 |
| A | 1 | 1 | 0 |

This operation is performed by a Disjunctive logical element.

Equivalence—yields a 1 out if the inputs are alike.

| | | B 0 | B 1 |
|---|---|---|---|
| A | 0 | 1 | 0 |
| A | 1 | 0 | 1 |

This operation is performed by an Equivalence logical element.

Exclusive-OR—yields a 1 out if the inputs are unlike.

| | | B 0 | B 1 |
|---|---|---|---|
| A | 0 | 0 | 1 |
| A | 1 | 1 | 0 |

This operation is performed by an Exclusive-OR logical element.

Half-Addition—is the addition of only two digits of the same digital order, yielding the sum of said digits and the carry digit. The process is called Half-Addition because it does not take into account any carry digit from the next lower digital order. The sum digit, designated as S, of the pair of digits $A_n$ and $B_n$ which are added is the yield of an Exclusive-OR operation on the digits $A_n$ and $B_n$. The carry digit designated by the symbol K is the yield of a Conjunctive operation on the digits $A_n$ and $B_n$.

| Addend $A_n$ | Augend $B_n$ | Sum S | Carry K |
|---|---|---|---|
| 0 | 0 | 0 | 0 |
| 1 | 0 | 1 | 0 |
| 0 | 1 | 1 | 0 |
| 1 | 1 | 0 | 1 |

This operation is performed by a Half-Adder.

Adjunction—a term generic to Conjunction and to Disjunction. Thus the term Adjunctive logical element covers a logical element that performs one of these operations and also covers a logical element that performs both of these operations.

NOT—yields the opposite digit or number of the digit input. Whereas the aforementioned logical elements perform a mathematical operation in combining two binary digital numbers, the NOT logical element operates on a single binary digital number. Thus, if the input to a NOT logical element is 1, the output is 0 and vice versa.

To add two binary digital numbers in the series mode, the numbers to be added are considered digit by digit beginning with the least significant digit, and a separate operation of addition is performed on each pair of corresponding digits. In the addition of the $n$th corresponding digits of the two numbers, the carry term from the addition operation of the $(n-1)$th corresponding digits is included in the addition in order to obtain the correct result. Thus, the operation of addition on two binary digital numbers in the series mode must conform to the following truth table:

| $A_n$ | $B_n$ | $C_{n-1}$ | $\Sigma_n$ | $C_n$ |
|---|---|---|---|---|
| 0 | 0 | 0 | 0 | 0 |
| 1 | 0 | 0 | 1 | 0 |
| 0 | 1 | 0 | 1 | 0 |
| 1 | 1 | 0 | 0 | 1 |
| 0 | 0 | 1 | 1 | 0 |
| 1 | 0 | 1 | 0 | 1 |
| 0 | 1 | 1 | 0 | 1 |
| 1 | 1 | 1 | 1 | 1 |

In this table $A_n$, $B_n$ represent $n$th corresponding digits of the two numbers to be added. The term $C_{n-1}$ represents the carry term from the operation of addition performed on the $(n-1)$th corresponding digits. The sum term is represented by $\Sigma_n$ and the carry term is represented by $C_n$. This carry term is used in performing the operation of addition on the $(n+1)$th corresponding digits.

In order to construct a computer which will perform the operations demanded by the truth table, and which will thereby act as an adder, equations representing the operations in the table must be formulated. Boolean algebra, a branch of mathematics well suited to express mathematical relationships in the binary number system, will be employed here. An equation formulating the conditions under which the sum term $\Sigma_n$ is unity, as shown in the truth table, is as follows, $$\Sigma_n = A_nB_n'C_{n-1}' + A_n'B_nC_{n-1}' + A_n'B_n'C_{n-1} + A_nB_nC_{n-1} \quad (1)$$

In this notation the primed symbols indicate the NOT of the unprimed symbols. Thus, the first term to the right of the equality sign yields a 1 if $A_n$ is 1 and $B_n$ is not 1 and $C_{n-1}$ is not 1. If any of the four terms to the right of the equality sign are 1, $\Sigma_n$ is 1.

Equation 1 may be reduced and simplified according to the following steps, $$\Sigma_n = C_{n-1}'(A_nB_n' + A_n'B_n) + C_{n-1}(A_n'B_n' + A_nB_n) \quad (2)$$

$$\Sigma_n = C_{n-1}'(A_n'B_n' + A_nB_n)' + C_{n-1}(A_n'B_n' + A_nB_n) \quad (3)$$

The term within the parentheses yields a 1 if $A_n$, $B_n$ are both 1 or both 0; therefore, the term within the parentheses represents an Equivalence operation on the numbers $A_n$, $B_n$. Consequently, letting, $$X_n = A_n'B_n' + A_nB_n \quad (4)$$

the following expression is obtained, $$\Sigma_n = C_{n-1}'X_n' + C_{n-1}X_n \quad (5)$$

in which the term $X_n$ represents an Equivalence operation on the numbers $A_n$, $B_n$.

In a similar manner an expression for the term $C_n$ may be formulated from the truth table according to the following equation $$C_n = A_nB_nC_{n-1}' + A_nB_n'C_{n-1} + A_n'B_nC_{n-1} + A_nB_nC_{n-1} \quad (6)$$

This equation may be further reduced, $$C_n = C_{n-1}(A_n'B_n + A_nB_n') + A_nB_n(C_{n-1}' + C_{n-1}) \quad (7)$$

$$C_n = C_{n-1}(A_n'B_n' + A_nB_n)' + A_nB_n \quad (8)$$

Once more substituting the term $X_n$ for the Equivalence operation on the numbers $A_n$ and $B_n$, and then simplifying the resulting equation in order to more readily construct the computer, there results, $$C_n = C_{n-1}X_n' + A_nB_n \quad (9)$$

$$C_n = [(C_{n-1}' + X_n)(A_nB_n)']' \quad (10)$$

Equation 10 is not in its simplest form. It can be reduced to:

$$C_n = A_nB_n + A_nC_{n-1} + B_nC_{n-1} \quad (11)$$

However, Equation 10 is more useful than Equation 11 since it is written as a function of $X_n$.

Equations 5 and 10 express mathematically the means by which the computer of this invention performs the operation of addition on two binary digital numbers in the serial mode. Thus, to obtain the sum term $\Sigma_n$, it is first necessary to generate the Equivalence term $X_n$ from the two corresponding input digits $A_n$, $B_n$. An Equivalence operation is then performed on the Equivalence term $X_n$ and on the previous carry term $C_{n-1}$, the operation yielding the sum term $\Sigma_n$, as shown in Equation 5. Equation 10 indicates that the carry term may be generated by first performing a Conjunctive operation on the binomial of the NOT of the previous carry term OR the Equivalence term and the Disjunctive operation on $A_n$ and $B_n$, and then performing a NOT operation on the result.

A circuit element which is suitable for use in a binary digital computing circuit and which facilitates assemblage of the instant adder according to the principles formulated in Equations 5 and 10 is shown in Fig. 1. For purposes of simplicity, this circuit element will henceforth be termed a functor. The functor comprises a pair of toroidal magnetic cores 10 and 11, on each core there being wound an input, an output, and a reset winding. Input winding 12, output winding 13, and reset winding 14 are wound on core 10. Input winding 15, output winding 16, and reset winding 17 are wound on core 11. Windings 12 and 15 are series connected forming a current path between input terminals 19 and 27. Input signal current enters one of these terminals which may be termed the "current-in input terminal," and after passing through windings 12 and 15 leaves through the other input terminal, which may be termed the "current-out input terminal." The magnetization effect of each winding on its core is indicated by the presence of a dot near one end or terminal of the winding. Positive current entering the dotted terminal of any winding tends to set up magnetic flux in the core in the arbitrarily assigned positive direction, as shown by the arrows.

Figure 2:
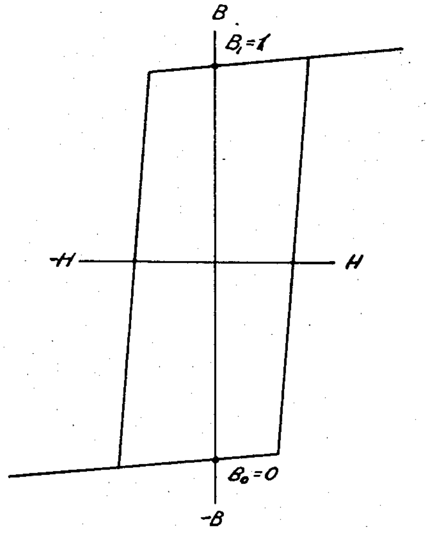
Fig. 2 is a graph illustrating a hysteresis loop of a magnetic material used in the element of Fig. 1.

An idealized hysteresis loop of the cores of the functor is shown in Fig. 2. These cores have the property of low coercive force and high residual magnetism. A core may be readily magnetized with a given direction of residual magnetic field or into a given remanence state by applying sufficient current of proper polarity to any of its windings to drive the core to saturation. A core is magnetized into the defined unity remanence state by applying positive saturating current to the dotted terminal of any of its windings. Similarly, a core is magnetized into the zero remanence state by applying positive saturating current to the undotted terminal of any of its windings. Thus, if a core is in the zero state, a large positive pulse of current entering the dotted terminal of any one of its windings is sufficient to change the remanence state from zero to unity. On the other hand, with the core in the zero state, if the positive pulse of current enters the winding at the undotted terminal, no change of remanence state occurs and the core will remain magnetized in the zero state.

Figure 3:
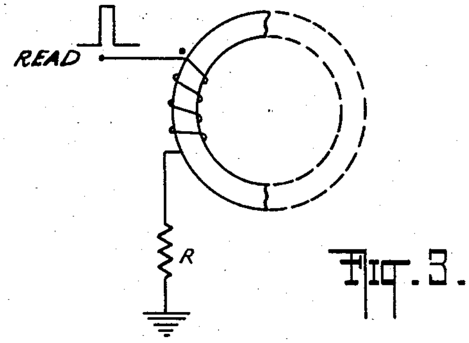
Fig. 3 is a circuit used to illustrate the operation of the element of Fig. 1.

To illustrate how pulses are read out of the functor, the exemplary circuit of Fig. 3 is used. In this circuit a coil wound on a magnetic core, such as is used in the functor, is shown in series with a resistance. If the core is in the zero remanence state, a positive pulse of current applied to the read terminal enters the winding at its dotted end and passes through the resistor to ground. The pulse of current tends to change the state of the core from zero to one and the residual magnetism from $B_0$ to $B_1$. This attempted change of flux through its turns will induce a voltage in the winding, causing it to act as a high impedance. Thus, most of the voltage applied to the read terminal will appear across the winding and but a very small portion across the resistor. If the core is magnetized in the unity remanence state, a positive pulse of current applied to the dotted terminal of the coil tends to cause no change of remanence state. Consequently, there will be but little voltage induced in the winding, and it acts as a low impedance, so that most of the voltage applied to the read terminal will appear across the resistor.

The appearance of a pulse across the resistor of Fig. 3 occurs when the core is in a unity state. Hence, the output pulse on the resistor when the core is in the unity state may be considered to be an output of unity. The absence of an output pulse when the core is in the zero state may be considered to be an output of zero. Therefore, in this functor and in its associated circuitry, the presence of a pulse indicates the presence of the digit 1 and the absence of a pulse the presence of the digit 0.

The windings of the functor are energized by positive pulses from a clock source. The clock source delivers periodic trains of pulses at a plurality of terminals. While the periods of all pulse trains are alike, the pulses in different trains are displaced in time. The functor reset terminal 18 and read terminal 20 are connected directly to different terminals of the clock source. The input terminal 19 is connected to another terminal of the clock source either directly or through intermediate circuitry which may or may not permit passage of the particular clock pulse to the input terminal 19. It is necessary that the terminals of the clock source be so selected that the cyclical order of pulses energizing the functor windings follow the pattern of reset, input, and read.

The clock pulses applied to reset terminal 18 enter reset winding 14 at its undotted end and reset winding 17 at its dotted end, thereby setting core 10 to 0 and core 11 to 1. A positive pulse applied to input terminal 19 enters input winding 12 at its dotted end and input winding 15 at its undotted end. If no input pulse reaches input terminal 19 during a particular clock cycle, the cores remain in their reset state. However, if a pulse enters input terminal 19, core 10 is set to 1 and core 11 is set to 0.

A pulse applied to the read terminal 20 enters winding 13 at its dotted end. Output terminal 21 acts only as a current source or generator of electric current pulses. If core 10 is set to 0, the output winding 13 acts as a high impedance and little current can flow from output terminal 21. Thus, the output signal from output terminal 21, will be a 0 in accordance with the principles explained in connection with Fig. 3. If core 10 is set to 1, the output winding 13 acts as a low impedance and an output pulse, representing the number 1, will appear at output terminal 21.

Output terminal 22, which acts only as a current sink, or receiver of electric current pulses, is connected through intermediate circuitry to the same terminal of the clock source as read terminal 20. With core 11 set to 0, output winding 16 acts as a high impedance and prevents current flow in the intermediate circuitry. Thus, the signal from the terminal 22 may be said to be a 0. If core 11 is set to 1, output winding 16 acts as a low impedance and permits current to flow in the intermediate circuit connected to terminal 22 and to enter winding 16 and flow to ground therethrough. Thus, the signal from terminal 22 may be said to be a 1.

Summarizing the above analysis, if the input signal to the functor is 1, the output signal from terminal 21 is 1, and the output signal of terminal 22 is 0. On the other hand, if the input signal is 0, the output signal from terminal 21 is 0, and the output signal from terminal 22 is 1. The electrical significance of such a result is that with an input of 1, the functor will deliver a pulse at one output terminal, but will not allow reception of a pulse at the other output terminal. If the input is 0, the functor will deliver no pulse at one output terminal, but will allow reception of a pulse at the other output terminal. A functor which operates in this manner is designated a functor zero.

If the output windings of the two cores are each wound in the opposite direction from that of Fig. 1, the functor will perform in an opposite manner. In this case, an input 1 will yield an output of 0 at terminal 21 and an output of 1 at terminal 22. Again expressing its operation electrically, if the input is 1, the functor will not deliver an output pulse at one output terminal, but will allow reception of a pulse at the other output terminal. Such a functor is designated as a functor one.

In its use in a computing circuit a functor is interconnected with other functors. Thus, in the functor of Fig. 1, input terminal 19 is connected to a current source output terminal of a preceding functor, and since current flows into it, terminal 19 is the current-in input terminal. Input terminal 27 is connected to a current sink output terminal of a preceding functor, and since current flows out of it, terminal 27 is the current-out input terminal. Similarly, output terminals 21 and 22 are connected to input terminals of succeeding functors. Thus, input winding 12 and 15 are in series with each other and in series with a preceding current source output terminal and a preceding current sink output terminal. Only if both the preceding current source and the preceding current sink generate an output signal of 1 does a current pulse flow in the input windings 12 and 15. If either or both of the preceding functors generates an output signal of 0, a 0 signal will be applied to the input windings 12 and 15. Thus, the functor zero of Fig. 1 yields a 1 at its current source terminal 21 only if both inputs are 1, and therefore, acts basically as a Conjunctive logical element.

In similar manner, the functor one yields a 1 at its current source output terminal if the inputs are either 1—0 or 0—1, or both 0, and, therefore, acts basically as a Disjunctive logical element.

Figure 4:
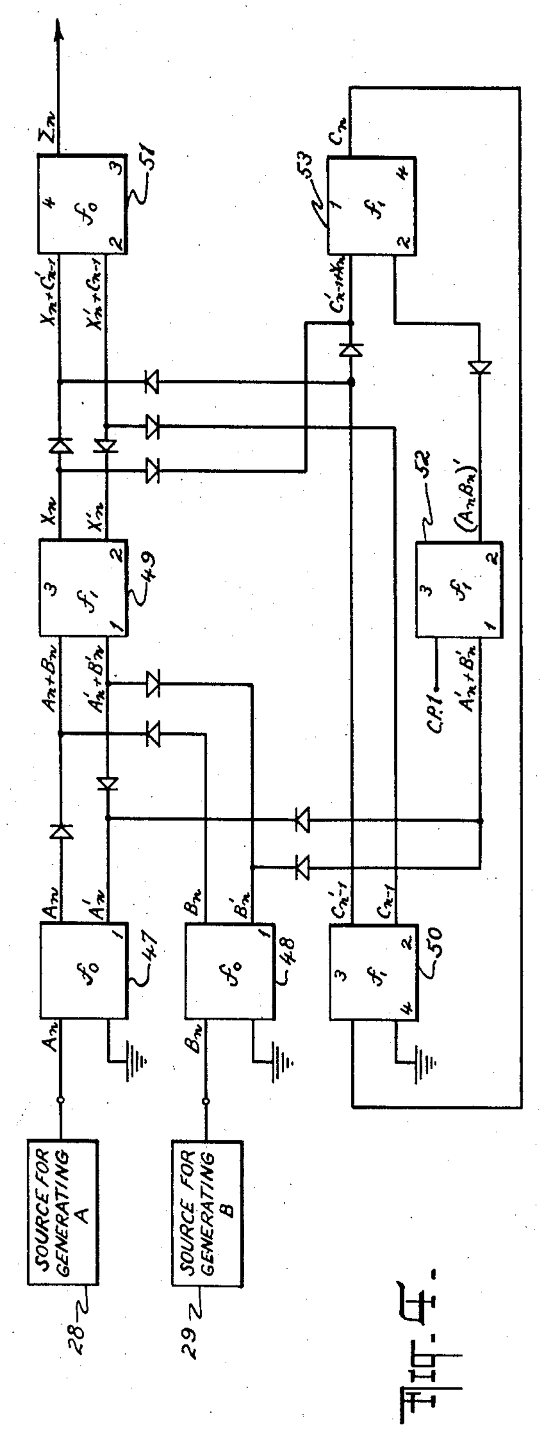
Fig. 4 is a circuit diagram of the preferred adding circuit of this invention.

The adding circuit of this invention, shown in Fig. 4, is constructed by proper interconnection of a plurality of functor elements of the type described. In this figure, the functor elements are shown as blocks having four terminals, the two terminals on the left of each block representing the input terminals and the two terminals on the right representing the output terminals. The upper input terminal is the current-in input terminal and the lower input terminal is the current-out input terminal. The upper output terminal is the current source terminal and the lower output terminal is the current sink terminal. This circuit is capable of adding two binary digital numbers, A, B in the series mode, each number being represented by a train of electrical pulses, and of delivering at an output terminal a single binary digital number in the series mode, represented by a train of electrical pulses, which is the sum of the numbers A, B. The circuit operates according to the principles formulated in Equations 5 and 10.

Figure 5:
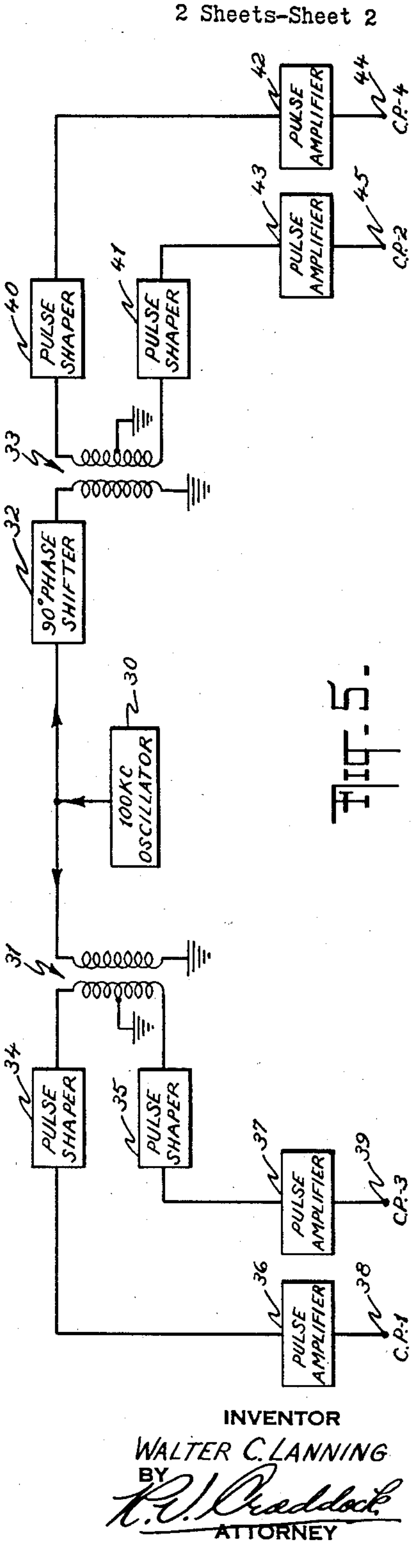
Fig. 5 is a circuit diagram of a clock source to be used in conjunction with the circuit of Fig. 4.

A clock source for delivering positive pulses to the reset, input, and output windings is shown in Fig. 5. The instant clock source delivers four clock pulses spaced 90° apart during one clock cycle, the clock cycles recurring at 100 kc. A 100 kc. oscillator 30 determines the recurrence frequency of the clock pulses. The output signal of oscillator 30 is split into two portions, one portion being applied to the primary winding of a transformer 31 and the other portion, after being delayed by 90° in phase shifted 32, being applied to the primary winding of a transformer 33. The secondary winding of transformer 31 is center tapped in order to provide two signals, one from each end of the secondary winding, 180° out of phase with each other. The two signals from the secondary winding of transformer 31 are passed through respective pulse shaper networks 34 and 35 and respective pulse amplifiers 36 and 37 to clock pulse terminals 38 and 39. The secondary winding of transformer 33 is center tapped in order to provide two signals, one from each end of the secondary winding, 180° out of phase with each other, and also 90° out of phase with respect to corresponding signals delivered by the secondary winding of transformer 31. The two signals from the secondary winding of transformer 33 are passed through respective pulse shaper networks 40 and 41 and respective pulse amplifiers 42 and 43 to clock pulse terminals 44 and 45. Thus, the output of the clock source is a series of recurring positive pulses from each of four output terminals. The pulse recurrence frequency of the signal from each terminal is 100 kc. One pulse is delivered from each of the terminals during each cycle of oscillator 30. The clock pulses are delivered in cyclical order from terminals 38, 45, 39 and 44. Terminals 38, 45, 39 and 44 are respectively labeled CP–1, CP–2, CP–3 and CP–4 to indicate the cyclical order of the clock pulse available at that terminal.

Referring again to Fig. 4, in the block representing each functor is a series of numerals representing clock pulse numbers. The numeral in the lower left corner indicates the number of the clock pulse which energizes the input windings of the functor. The numeral in the lower right corner indicates the number of the clock pulse which energizes the output windings of the functor. The numeral in the top center portion of the block indicates the number of the clock pulse which resets the functor cores.

In operation, a pair of electrical pulse trains representing respectively two binary digital numbers A, B in the series mode are generated in respective sources 28, 29, which may be preceding computer circuits. These pulse trains are applied to input terminals of functors 47 and 48. The particular digits entering the input terminals are designated $A_n$, $B_n$. The other input terminal of each of functors 47 and 48 is connected to ground, thereby providing a ready path through both input windings of each functor for all pulses which appear in the applied pulse trains. Functors 47 and 48 are both of the functor zero type, so that the signals at their current source output terminals represent a Conjunctive operation on the input signals to each functor. Because of the ground connection, one of the input signals to each of functors 47 and 48 is always 1. Since the Conjunctive operation on any number and unity is that number, the signals from the current source output terminals of functors 47 and 48 will be respectively $A_n$, $B_n$. The signals from the current sink output terminals of functors 47 and 48 will be respectively the NOT of $A_n$, $B_n$; that is, $A_n'$, $B_n'$.

The current source output terminals of functors 47 and 48 are connected in parallel to one input terminal of a functor 49, which is a functor one. Thus, the signal to this terminal, as shown, is the mathematical operation $A_n$ OR $B_n$. The current sink output terminals of functors 47 and 48 are connected in parallel to the other input terminal of functor 49. The signal to this terminal is $A_n'$ OR $B_n'$.

Functor 49, being of the functor one type, performs a Disjunctive operation on the signals applied to its input terminals. This Disjunctive operation is formulated in the following equation, $$[(A_n+B_n)\quad(A_n'+B_n')]' \tag{12}$$

which may be reduced to the following simplified expression, $$A_n'B_n'+A_nB_n=X_n \tag{13}$$

Equation 13 states that functor 49 yields a 1 out if the digits $A_n$, $B_n$ are both 1 or both 0. This result is an Equivalence operation on the digits $A_n$, $B_n$, and is represented by the symbol $X_n$. This Equivalence operation yield is delivered at the current source output terminal of functor 49. The NOT yield of this Equivalence operation is delivered at the current sink output terminal of functor 49. However, since the NOT of an Equivalence operation is an Exclusive-OR operation, it is seen that both the Equivalence and Exclusive-OR operations on the numbers $A_n$, $B_n$ are available at the output terminals of functor 49.

Referring to the clock pulse numerals for functors 47, 48, and 49, if the output signals are read out of functors 47 and 48 and into functor 49 on clock pulse 1, the output of functor 49 may be read out on a succeeding clock pulse, such as clock pulse 2.

The carry term $C_{n-1}$ from the preceding digit addition, has been stored in a functor 50, which is of the functor one type, and is available for use after the signals $A_n$, $B_n$ have been introduced into the system. The NOT of the preceding carry term is available at the current source output terminal of functor 50 and the preceding carry term is available at the current output sink terminal. The current source output terminals of functors 49 and 50 are connected in parallel to one input terminal of a functor 51, which is a functor zero, the input signal to that terminal being $X_n$ OR $C_{n-1}'$. The current sink output terminals of functors 49 and 50 are connected in parallel to the other input terminal of functor 51, the input signal to that terminal being $X_n'$ OR $C_{n-1}$. Functor 51 performs a Conjunctive operation on the two input signals, this operation being represented in the following expression, $$(X_n+C_{n-1}')\ (X_n'+C_{n-1}) \qquad (14)$$

which may be simplified as follows, $$X_nC_{n-1}+X_n'C_{n-1}'=\Sigma_n \qquad (15)$$

However, this equation is the same as Equation 5. Thus, the signal available at the current source output terminal of functor 51 represents an Equivalence operation on the digits $X_n$, $C_{n-1}$ and is the desired sum term of the adder.

In order to complete the operation of addition it is necessary to generate a carry term for use on the digit addition of the terms of next higher significance. This is accomplished by interconnecting additional functors to perform the mathematical operation described in Equation 10.

The current sink output terminals of functors 47 and 48 are connected in parallel to one input terminal of a functor 52, which is of the functor one type. The other input terminal of functor 52 is connected to the CP–1 terminal of the clock source. Thus, functor 52 stores a term representing a Disjunctive operation on $A_n'$ OR $B_n'$ and a continuous series of unity digits. The output signal of functor 52 from the current sink output terminal is therefore the same as the input signal $A_n'$ OR $B_n'$ and may be also written as $(A_nB_n)'$. The purpose of functor 52 is to store this operation on the output signals from functors 47 and 48 in order to make it available for use when the signals from funnctors 49 and 50 are read out while generating the sum signal. Thus, on clock pulse 2 the output signals of functors 49, 50 and 52 are applied to a functor 53 for generating the carry term. The current source output terminals of functors 49 and 50 are connected in parallel to one input terminal of functor 53, the input signal to that terminal being $C_{n-1}'$ OR $X_n$. The current sink output terminal of functor 52 is connected to the other input terminal of functor 53. Functor 53 is of the functor one type and therefore its output signal available at its current source output terminal, is a Disjunctive operation on the two input signals. However, this Disjunctive operation by functor 53 is identically that of Equation 10, which equation was that of the carry term. Consequently, the output signal from the current source output terminal of functor 53 is the carry term of the two digits being added.

Both the sum terms and the carry terms were stored in respective functors 51 and 53 on clock pulse 2. The sum term may therefore be read out of functor 51 on either the third or fourth clock pulses in the clock cycle, although it is preferable to read out the sum term on the third clock pulse to obtain speediest operation of the computor. The same latitude is not available in reading out the carry term from functor 53. This is due to the fact that functor 50 which is to store this carry pulse is not reset and available for an input signal until after clock pulse 3. Consequently, the carry term must be read out of functor 53 and into functor 50 on clock pulse 4 by means of a connection between the current source output terminal of functor 53 and an input terminal of functor 50.

While the functors used and their interconnections described in reference to the circuit of Fig. 4 represents the preferred embodiment of this invention, many modifications may be made in the circuit without departing from the spirit of this invention. Thus, functors 47 and 48 may both be of the functor one type. In such case, if their current source output terminals are connected in parallel and to one input terminal of functor 49, and their current sink output terminals are connected in parallel and to the other input terminal of functor 49, the signals available at the output terminals of functor 49 remain unchanged from those of Fig. 4. However, in order to generate the carry term $C_n$, it is necessary to connect the current source output terminals of functors 47, 48, the output of these terminals being $A_n'$, $B_n'$, in parallel to one input terminal of functor 52, while the other input terminal of this functor is connected to ground or some equivalent return path that always permits the flow of current. With these connections, there is again available at the output of functor 52, a signal representing a Disjunctive operation on $A_n$, $B_n$.

Functors 47 and 48 may also be unlike, that is, one of these may be a functor zero and the other a functor one. With the current source output terminals of functors 47 and 48 connected in parallel to one input terminal of functor 49 and their current sink output terminals connected in parallel to the other input terminal of functor 49, the Conjunctive operation on the input signals to functor 49 represents an Equivalence operation on $A_n$, $B_n$. Thus, the signals available at the output terminals of functor 49 will represent Equivalence and Exclusive-OR operations on $A_n$, $B_n$, whether functor 49 is of the functor zero or the functor one type. In order to generate the carry term, the signals $A_n$, $B_n$ must be coupled to different input terminals of functor 52. One of these signals is generated at the current source output terminal of the functor zero element and the other at the current sink output terminal of the functor one element. In this manner, the signal $A_n'$ OR $B_n'$ is available at one output terminal of functor 52, regardless of the type functor used.

In a similar manner, functors 50 and 53 can be of either type since the particular carry term may be selected at an appropriate output terminal of each element.

Functor 51 may be of either type since the sum term would be available at one of its two output terminals.

The combination of the functors 47, 48, 49 and 52 of Fig. 4 is useful for performing the operation of Half-Addition. As shown in this figure, the signal available at the current sink output terminal of functor 49 represents an Exclusive-OR operation on the digits $A_n$, $B_n$, this term being the desired sum term S of a Half-Adder. The signal available at the current source output terminal of functor 52 represents a Conjunctive operation on $A_n$, $B_n$, this signal being the desired carry term K of a Half-Adder. Consequently, this portion of the circuit is useful as a Half-Adder.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A digital computer circuit for adding first and second binary digital numbers respectively represented by first and second electrical signals, said circuit including a plurality of logical elements each having an input including a current-in input terminal and a current-out input terminal, and an output including a current source output terminal and a current sink output terminal, and each of said elements being adapted to receive two input signals representing respective binary digits at a pair of input terminals and in response to a read signal delivered to the element to cause a binary one to appear at one of said output terminals and a binary zero at the other when both input signals represent ones, and signals representing respectively zero and one at said respective output terminals when any one of the input signals represents zero, comprising clock means for generating electrical clock pulses at a plurality of terminals, the pulses generated at a particular one of said terminals having the same recurrence frequency as the pulses generated at the other terminals but being non-coincident in time with said other pulses, whereby successive pulses from all the terminals within one pulse period constitute a clock cycle; first and second of said logical elements, means for concurrently applying signals respectively representing said first number and a binary 1 to the respective input terminals of said first logical element and means for concurrently applying signals respectively representing said second number and a binary 1 to the respective input terminals of said second logical element; a third of said logical elements, the current source output terminals of the first and second logical elements being connected in parallel to one input terminal of the third logical element and the current sink output terminals of the first and second logical elements being connected in parallel to the other input terminal of the third logical element, means for connecting the read terminals of the first and second logical elements to a first terminal of said clock means, whereby the signals available at the output terminals of the third logical element represent respectively Equivalance and Exclusive-OR operations on simultaneous digits of said first and second members; a fourth of said logical elements which stores the carry term of the immediately preceding digit addition; a fifth of said logical elements, the read terminals of the third, fourth and fifth logical elements being connected to a second terminal of said clock means, the pulse output of said second clock terminal occurring later in the clock cycle than the pulse output of said first clock terminal, means connected to the input of the fifth logical elements for producing at an output terminal thereof an output signal which represents a Disjunctive operation on simultaneous digits of said first and second numbers, the latter means including connections from one output terminal of each of the first and second logical elements to the input of the fifth logical element; a sixth of said logical elements, the current source output terminals of the third and fourth logical elements being connected in parallel to one input terminal of the sixth logical element and the current sink output terminals of the third and fourth logical elements being connected in parallel to the other input terminal of the sixth logical element, whereby the signal available at one of the output terminals of the sixth logical element represents the sum of said first and second numbers; a seventh of said logical elements, one of the output terminals of each of the third and fourth logical elements being connected in parallel to one of the input terminals of the seventh logical element, and the Disjunctive output terminal of the fifth logical element being connected to the other input terminal of the seventh logical element, whereby the signal available at one of the output terminals of the seventh logical element represents the carry term of the digits being added, the read terminal of the seventh logical element being connected to a third terminal of said clock means, the pulse output of said third clock terminal occurring later in the clock cycle than the pulse output of said second clock terminal, means for storing in the fourth logical element the borrow term generated in the seventh logical element for use in the operation of addition on the next higher significant digits of said first and second numbers, the latter means including a connection from the output of the seventh logical element to one input terminal of the fourth logical element and means for applying a binary 1 signal to the other input terminal of the fourth logical element, the aforesaid connections between output terminals and input terminals of respective logical elements being further characterized in that current-source output terminals are connected only to current-in input terminals and current-sink output terminals are connected only to current-out input terminals.

2. In a digital computer circuit for adding first and second binary digital numbers respectively represented by electrical signals, a circuit including a plurality of logical elements each having an input including a current-in input terminal and a current-out input terminal, and an output including a current source output terminal and a current sink output terminal, and each of said elements being adapted to receive two input signals representing respective binary digits at a pair of input terminals and to cause to appear at one of said output terminals a binary 1 and at the other output terminal a binary 0 when both input signals represent ones and the reverse at said output terminals when any one of the input signals represents zero, comprising first and second of said logical elements, means for concurrently applying signals respectively representing a digit of said first number and a binary 1 to the respective input terminals of said first logical element and means for concurrently applying signals respectively representing a digit of said second number and a binary 1 to the respective input terminals of said second logical element, said digits of said numbers being of corresponding order, a third of said logical elements, the current source output terminals of the first and second logical elements being connected in parallel to one input terminal of the third logical element and the current sink output terminals of the first and second logical elements being connected in parallel to the other input terminal of the third logical element, whereby the signals available at the output terminals of the third logical element represent respectively Equivalence and Exclusive-OR operations on said corresponding order digits of said first and second numbers, a fourth of said logical elements, means connected to said fourth logical element for storing therein the carry term of the immediately preceding order digit addition, the latter means including means for applying to the respective input terminals of the fourth logical element a binary 1 signal and a signal indicative of said carry term, a fifth of said logical elements, means connected to the input of the fifth logical element for producing at an output terminal thereof an output signal which represents a Disjunctive operation on said corresponding order digits of said first and second numbers, the latter means including connections from one output terminal of each of the first and second logical elements to the input of the fifth logical element, a sixth of said logical elements, the current source output terminals of the third and fourth logical elements being connected in parallel to one input terminal of the sixth logical element and the current sink output terminals of the third and fourth logical elements being connected in parallel to the other input terminal of the sixth logical element, whereby the signal available at one of the output terminals of the sixth logical element represents the sum of said corresponding order digits of said first and second numbers plus the carry of the immediately preceding order digit addition, a seventh of said logical elements, one of the output terminals of each of the third and fourth logical elements being connected in parallel to one of the input terminals of the seventh logical element, and the Disjunctive output terminal of the fifth logical element being connected to the other input terminal of the seventh logical element, whereby the signal available at one of the output terminals of the seventh logical element represents the carry term of the digits being added, the aforesaid connections between output terminals and input terminals of respective logical elements being further characterized in that current-source output terminals are connected only to current-in input terminals and current-sink output terminals are connected only to current-out input terminals.

3. In a binary digital addition circuit including means for providing signals respectively indicative of addend and augend digits, and also including an Equivalence logical circuit for receiving signals representing respectively addend and augend digits and responsive thereto for delivering an output signal representing an Equivalence operation on corresponding order digits of said addend and augend, and further including storage means for storing the carry term of the immediately preceding order digit addition and for supplying at respective output terminals thereof signals representing said carry term and the NOT of said carry term, a circuit for generating the carry term comprising a first logical element having an output terminal and an input including a current-in input terminal and a current-out input terminal, the signal from the output terminal of the first logical element representing an Adjunctive operation on signals applied to the input terminal, means for causing said first logical element to provide an Adjunctive output signal which represents a Disjunctive operation on said corresponding digits of said addend and augend, the latter means including means for applying signals indicative of the addend and augend digits to the input of said first logical element, a second logical element having at least one output terminal and an input including a current-in input terminal and a current-out input terminal, the output signal from said second logical element representing an Adjunctive operation on signals applied to the input terminal pair of said second logical element, means for applying said Equivalence output signal and the NOT signal of said stored carry term in parallel to one input terminal of said second logical element, and means for applying the output signal of said first logical element to the other input terminal of said second logical element.

4. The circuit of claim 3 further including means for connecting the output terminal of said second logical element to said storage means.

5. In a binary digital addition circuit including means for providing signals respectively indicative of addend and augend digits, and also including an Equivalence logical circuit for receiving signals representing respectively addend and augend digits and responsive thereto for delivering an output signal representing an Equivalence operation on corresponding order digits of said addend and augend, and further including storage means for storing the carry term of the immediately preceding order digit addition and for supplying at respective output terminals signals representing said carry term and the NOT of said carry term, a circuit for generating the carry term comprising first and second functors, means for causing said first functor to provide an Adjunctive output signal which represents a Disjunctive operation on said corresponding digits of said addend and augend, the latter means including means for applying signals indicative of the addend and augend digits to the input of said first functor, means for applying said Equivalence output signal and the NOT signal of said stored carry term in parallel to one input terminal of said second functor, and means for applying said output signal of said first functor to the other input terminal of said second functor.

6. The circuit of claim 5 further including means for connecting an output terminal of said second functor to said storage means.

7. A digital computer circuit for adding first and second binary digital numbers respectively represented by first and second trains of electrical signal pulses, comprising first to the seventh logical elements each having a current-in input terminal, a current-out input terminal, a current-source output terminal and a current-sink output terminal, the signal from one of said output terminals of each logical element representing a Conjunctive operation and the signal from the other output terminal representing a Disjunctive operation on signals applied to said input terminals of that logical element, means for concurrently applying signals respectively representing said first number and a binary 1 to the respective input terminals of said first logical element, whereby said first logical element provides at its respective output terminals signals representing respectively the digits of the first number and the NOT thereof, means for concurrently applying signals respectively representing said second number and a binary 1 to the respective input terminals of said second logical element, whereby said second logical element provides at its respective output terminals signals representing respectively the digits of the second number and the NOT thereof, the Conjunctive output terminals of said first and second logical elements being connected in parallel to one input terminal of said third logical element and the Disjunctive output terminals of said first and second logical elements being connected in parallel to the other input terminal of said third logical element, whereby the Disjunctive output terminal of said third logical element represents an Equivalence operation on corresponding order digits of said first and second numbers, and whereby the Conjunctive output terminal of said third logical element represents an Exclusive-OR operation on simultaneous digits of said first and second numbers, said fourth logical element being a storage for the carry term of the immediately preceding digit addition, means for connecting the Disjunctive output terminals of said first and second logical elements in parallel to one input terminal of said fifth logical element, means for applying a binary 1 signal to the other input terminal of said fifth logical element, whereby the signal from the Conjunctive output terminal of said fifth logical element represents the NOT of a Conjunctive operation on simultaneous digits of said first and second numbers, the Disjunctive terminals of said third and fourth logical elements being connected in parallel to one input terminal of said sixth logical element and the Conjunctive terminals of said third and fourth logical elements being connected in parallel to the other input terminal of said sixth logical element, whereby the signal from the Conjunctive output terminal of said sixth logical element represents the sum of said first and second numbers, the Disjunctive output terminals of said third and fourth logical elements being connected in parallel to one input terminal of said seventh logical element and the Conjunctive output terminal of said fifth logical element being connected to the other input terminal of said seventh logical element, whereby the signal from an output terminal of said seventh logical element represents the carry term of the digits being added, means for transferring said carry term from the output of the seventh logical element into said fourth logical element where it is stored for use in the operation of addition on the next higher significant digits of said first and second numbers, the latter means comprising means connecting said output terminal of the seventh logical element to one input terminal of the fourth logical element and means for applying a binary 1 to the other input terminal of the fourth logical element, the aforesaid connections between output terminals and input terminals of respective logical elements being further characterized in that current-source output terminals are connected only to current-in input terminals and current-sink output terminals are connected only to current-out input terminals.

8. In a digital computer circuit for adding first and second binary digital numbers having corresponding order digits respectively represented by first and second electrical signals, a circuit comprising first to the seventh Adjunctive logical elements each having an input circuit including a current-in input terminal and a current-out input terminal, and an output circuit including a current source output terminal and a current-sink output terminal, means including means for applying said first electrical signal and a binary 1 signal to the respective input terminals of said first Adjunctive logicaal element and said second electrical signal and a binary 1 signal to the respective input terminals of said second Adjunctive logical element, whereby the signals from the output terminals of said first Adjunctive logical element represent said first electrical signal and the NOT thereof, and whereby the signals from the output terminals of said second Adjunctive logical element represent said second electrical signal and the NOT thereof, one output terminal of each of said first and second Adjunctive logical elements being connected in parallel to one input terminal of said third Adjunctive logical element and the other output terminal of said first and second Adjunctive logical elements being connected in parallel to the other input terminal of said third Adjunctive logical element, whereby the signals from the output terminals of said third Adjunctive logical element represent respectively an Equivalence operation and an Exclusive-OR operation on corresponding order digits of said first and second numbers, means for applying a binary 1 signal to one of the input terminals of said fourth Adjunctive element, said fourth Adjunctive logical element being responsive to the concurrent receipt of said binary 1 signal at said one of its input terminals and a signal indicative of the carry term of the immediately preceding digit addition at the other of its input terminals to store said carry term and to provide at its respective output terminals signals representing said carry term and the NOT of said carry term, means connected to the input terminals of said fifth Adjunctive element for producing at an output terminal thereof a signal representative of a Disjunctive operation on said corresponding order digits of said first and second numbers, said means including connections from one output terminal of each of the first and second Adjunctive elements to the input of the fifth Adjunctive element, one output terminal of each of said third and fourth Adjunctive logical elements being connected in parallel to one input terminal of said sixth Adjunctive logical element, and the other output terminal of each of said third and fourth Adjunctive logical elements being connected in parallel to the other input terminal of said sixth Adjunctive logical element, whereby the signal from an output terminal of said sixth Adjunctive logical element represents the sum of said corresponding order digits of said first and second numbers plus the carry of the immediately preceding order digit addition, one output terminal of each of said third and fourth Adjunctive logical elements being connected in parallel to one input terminal of said seventh Adjunctive logical element, and the last said output terminal of said sixth Adjunctive logical element being connected to the other input terminal of said seventh Adjunctive logical element, whereby the signal from an output terminal of said seventh Adjunctive logical element represents the carry term of the digits being added, the aforesaid connections between output circuits and input circuits of respective logical elements being further characterized in that current-source output terminals are connected only to current-in input terminals and current-sink output terminals are connected only to current-out input terminals.

9. The circuit of claim 8 wherein the last said output terminal of said seventh Adjunctive logical element is connected to said other input terminal of said fourth Adjunctive logical element whereby the carry term may be transferred to the fourth Adjunctive logical element for use in the operation of addition on the next higher order digits of said first and second members.

10. In a digital computer circuit for adding first and second binary digital numbers having corresponding order digits respectively represented by first and second electrical signals, apparatus comprising a logical circuit having input terminals connected to receive signals respectively representing corresponding order digits of said first and second numbers, a current-source output terminal and a current-sink output terminal, said logical circuit being responsive to the receipt of said first and second signals at its input terminals to provide at one of said output terminals a signal representing an Equivalence operation on said corresponding order digits and at the other output terminal a signal representing an Exclusive-OR operation on said corresponding order digits, storage means for storing the carry term of the immediately preceding order digit addition and for supplying as output signals at respective output terminals thereof said carry term and the NOT of said carry term, one of the latter two output terminals being a current source terminal, the other being a current-sink terminal; first, second and third Adjunctive logical elements each having an input including a current-in input terminal and a current-out input terminal, a current source output terminal and a current-sink output terminal, means for causing said first Adjunctive element to provide at an output terminal thereof a signal representing a Disjunctive operation on said corresponding order digits of said first and second numbers, the latter means including means for applying signals indicative of said first and second numbers to the input of said first Adjunctive element; the Equivalence output signal of said logical circuit and the NOT of the carry signal of said storage means being applied in parallel to one input terminal of said second Adjunctive logical element, and said Disjunctive output terminal of said first Adjunctive logical element being connected to another input terminal of said second Adjunctive logical element, whereby the output signal from an output terminal of the second Adjunctive logical element represents the carry term of the digits being added; the Equivalence output signal of said logical circuit and the NOT of the carry signal of said storage means being applied in parallel to one input terminal of said third Adjunctive logical element, and the Exclusive-OR output signal of said first logical element and the carry output signal of said storage means being applied in parallel to another input terminal of said third Adjunctive logical element, whereby the signal from an output terminal of said third Adjunctive logical element represents the sum of said corresponding order digits of said first and second numbers plus the carry of the immediately preceding order digit addition, the aforesaid connections between output terminals and input terminals of respective logical elements being further characterized in that current-source output terminals are connected only to current-in input terminals, and current-sink output terminals are connected only to current-out input terminals.

11. The computer circuit of claim 10, including means for connecting the carry term output terminal of the second Adjunctive logical element to the input of said storage means.

12. In a digital computer circuit for adding first and second binary digital numbers having corresponding order digits respectively represented by first and second electrical signals, apparatus comprising a logical circuit having output terminals and also having input terminals connected to receive signals respectively representing corresponding order digits of said first and second numbers, said logical circuit being responsive to the receipt of said first and second signals at its input terminals to provide at one of its output terminals a signal representing an Equivalence operation on said corresponding order digits, and at another of its output terminals a signal representing an Exclusive-OR operation on said corresponding order digits, storage means for storing the carry term of the immediately preceding digit addition and for supplying as output signals at respective output terminals thereof said carry term and the NOT of said carry term; first, second and third functors, means for causing said first functor to provide at an output terminal thereof a signal representing a Disjunctive operation on said corresponding order digits of said first and second numbers, the latter means including means for applying signals indicative of said first and second numbers to the input of said first functor; the Equivalence output signal of said logical circuit and the NOT of the carry signal of said storage means being applied in parallel to one input terminal of said second functor, and said Disjunctive output terminal of said first functor being connected to another input terminal of said second functor, whereby the output signal from an output terminal of the second functor represents the carry term of the digits being added; the Equivalence output signal of said logical circuit and the NOT of the carry signal of said storage means being applied in parallel to one input terminal of said third functor, and the Exclusive-OR output signal of said logical circuit and the carry output signal of said storage means being applied in parallel to another input terminal of said third functor, whereby the signal from an output terminal of said third functor represents the sum of said corresponding order digits of said first and second numbers plus the carry of the immediately preceding order digit addition.

13. A digital computer circuit for adding first and second binary digital numbers respectively represented by first and second trains of electrical signal pulses, comprising means for generating electrical clock pulses at a plurality of terminals, the pulses generated at each of said terminals having the same recurrence frequency as the pulses generated at the other terminals but being non-coincident in time with the pulses at said other terminals, whereby successive pulses from all the terminals within one pulse period constitute a clock cycle; first and second functors, means for concurrently applying signals respectively representing said first number and a binary 1 to the respective input terminals of the first functor for providing at its respective output terminals signals representing respectively the first number and the NOT thereof, means for concurrently applying signals representing said second number and a binary 1 to the respective input terminals of the second functor for providing at its respective output terminals signals representing respectively the second number and the NOT thereof, a third functor, the current source output terminals of the first and second functors being connected in parallel to one input terminal of the third functor and the current sink output terminals of the first and second functors being connected in parallel to the other input terminal of the third functor, means for connecting the read terminals of the first and second functors to a first terminal of said clock means, whereby the signals available at the output terminals of the third functor represent respectively Equivalence and Exclusive-OR operations on simultaneous digits of said first and second numbers; a fourth functor which in response to a signal indicative of the carry term of the immediately preceding digit addition and to a binary 1 signal at its respective input terminals stores said carry term; a fifth functor, the read terminals of the third, fourth and fifth functors being connected to a second terminal of said clock means, the pulse output of said second clock terminal occurring later in the clock cycle than the pulse output of said first clock terminal, means connected to the input terminals of the fifth functor for producing at an output terminal thereof a signal representative of a Disjunctive operation on corresponding order digits of said first and second numbers, said means including connections from an output terminal of each of the first and second functors to the input of the fifth functor; a sixth functor, the current source output terminals of the third and fourth functors being connected in parallel to one input terminal of the sixth functor and the current sink output terminals of the third and fourth functors being connected in parallel to the other input terminal of the sixth functor, whereby the signal available at an output terminal of the sixth functor represents the sum of said first and second numbers; a seventh functor one of the output terminals of the third and fourth functors being connected in parallel to one of the input terminals of the seventh functor, and said Disjunctive output terminal of the fifth functor being connected to the other input terminal of the seventh functor, whereby the signal available at an output terminal of the seventh functor represents the carry term of the digits being added, the read terminal of the seventh functor being connected to a third terminal of said clock means, the pulse output of said third clock terminal occurring later in the clock cycle than the pulse output of said second clock terminal, means including means for applying a binary 1 signal to one of the input terminals of the fourth functor and means connecting an output terminal of the seventh functor to the other input terminal of the fourth functor for storing in the fourth functor the carry term generated by the seventh functor for use in the operation of addition on the next higher significant digits of said first and second numbers.

14. In a digital computer circuit for adding first and second binary digital numbers respectively represented by first and second electrical signals, comprising functors, means for concurrently applying signals respectively representing a digit of said first number and a binary 1 to the respective input terminals of the first functor for providing at its respective output terminals signals representing respectively said digit of the first number and the NOT thereof, means for concurrently applying signals respectively representing a digit of said second number and a binary 1 to the respective input terminals of the second functor for providing at its respective output terminals signals representing respectively said digit of the second number and the NOT thereof, said digits of said numbers being of corresponding order, a third functor, the current source output terminals of the first and second functors being connected in parallel to one input terminal of the third functor and the current sink output terminals of the first and second functors being connected in parallel to the other input terminal of the third functor, whereby the signals available at the output terminals of the third functor represent respectively Equivalence and Exclusive-OR operations on said corresponding digits of said first and second numbers, a fourth functor, means for applying a binary 1 signal to one input terminal of said fourth functor, said fourth functor being responsive to said binary 1 signal at said one of its input terminals and to a signal indicative of the carry term of the immediately preceding digit addition at the other of its input terminals to store said carry term, a fifth functor, means connected to the input terminals of the fifth functor for producing an output terminal thereof a signal representative of a Disjunctive operation on said corresponding order digits of said first and second numbers, said means including connections from an output terminal of each of the first and second functors to the input of the fifth functor, a sixth functor, the current source output terminals of the third and fourth functors being connected in parallel to one input terminal of the sixth functor and the current sink output terminals of the third and fourth functors being connected in parallel to the other input terminal of the sixth functor, whereby the signal available at an output terminal of the sixth functor represents the sum of said corresponding order digits of said first and second numbers plus the carry of the immediately preceding order digit addition, a seventh functor, one of the output terminals of each of the third and fourth functors being connected in parallel to one of the input terminals of the seventh functor and said Disjunctive output terminal of the fifth functor being connected to the other input terminal of the seventh functor, whereby the signal available at an output terminal of the seventh functor represents the carry term of the digits being added.

15. The circuit of claim 14 including means which includes connections from an output terminal of the seventh functor to an input terminal of the fourth functor for storing in the fourth functor the carry term generated by the seventh functor for use in the operation of addition on the next higher significant digits of said first and second numbers.

References Cited in the file of this patent

UNITED STATES PATENTS

| | | |
|---|---|---|
| 2,781,504 | Canepa | Feb. 12, 1957 |
| 2,803,401 | Nelson | Aug. 20, 1957 |

FOREIGN PATENTS

| | | |
|---|---|---|
| 1,034,099 | France | Apr. 8, 1953 |

OTHER REFERENCES

Washburn: "An application of Boolean Algebra to the Design of Electronic Switching circuits," Communications and Electronics, September 1953, pp. 380–388.

Guterman et al.: Logical and Control Functions Performed with Magnetic Cores, Proc. of the IRE, March 1955, pp. 291–98.